(12) United States Patent
Duwenhorst et al.

(10) Patent No.: US 8,138,299 B2
(45) Date of Patent: Mar. 20, 2012

(54) THERMOPLASTIC POLYURETHANES

(75) Inventors: Jörn Duwenhorst, Lemförde (DE); Hauke Malz, Diepholz (DE); Karin Scheffer, Lemförde (DE); Thomas Flug, Wagenfeld (DE); Martin Vallo, Bramsche (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 106 days.

(21) Appl. No.: 11/912,403

(22) PCT Filed: Apr. 25, 2006

(86) PCT No.: PCT/EP2006/061824
§ 371 (c)(1),
(2), (4) Date: Oct. 24, 2007

(87) PCT Pub. No.: WO2006/114418
PCT Pub. Date: Nov. 2, 2006

(65) Prior Publication Data
US 2008/0194789 A1    Aug. 14, 2008

(30) Foreign Application Priority Data

Apr. 26, 2005  (DE) .................. 10 2005 019 663

(51) Int. Cl.
*C08G 18/00* (2006.01)

(52) U.S. Cl. .............. 528/83; 528/65; 528/80; 528/85; 528/44; 525/458; 252/182.2; 252/182.23; 252/182.24; 252/182.28

(58) Field of Classification Search .................. 525/457, 525/458, 440; 528/65, 80, 85, 308.3, 66; 252/182.2, 182.23, 182.24, 182.28
See application file for complete search history.

(56) References Cited

U.S. PATENT DOCUMENTS

| 4,436,869 | A | * | 3/1984 | Zipp et al. ........................ 525/51 |
| 4,778,830 | A | * | 10/1988 | Streu et al. ..................... 521/172 |
| 6,218,479 | B1 | | 4/2001 | Winkler et al. |
| 6,790,916 | B2 | * | 9/2004 | Brauer et al. ................. 525/457 |
| 2003/0162932 | A1 | | 8/2003 | Brauer et al. |
| 2004/0171767 | A1 | | 9/2004 | Pohlmann et al. |

FOREIGN PATENT DOCUMENTS

| CA | 2016960 | 11/1990 |
| DE | 3642667 A1 | 6/1988 |
| EP | 0398093 A2 | 11/1990 |
| EP | 1031588 A1 | 8/2000 |
| EP | 1338614 A1 | 8/2003 |
| WO | WO-03/014179 A1 | 2/2003 |

* cited by examiner

*Primary Examiner* — Milton I Cano
*Assistant Examiner* — Michael L Leonard
(74) *Attorney, Agent, or Firm* — Connolly Bove Lodge & Hutz LLP

(57) ABSTRACT

Thermoplastic polyurethanes which have a hardness of from 50 Shore A to 80 Shore A and are based on (b) polyester diols, wherein a polyester diol (b1) based on butane-1,4-diol and at least one further diol having at least 5 carbon atoms and a polyester diol (b2) based on butane-1,4-diol and at least one further diol having two or three carbon atoms are present as (b) polyester diols.

4 Claims, No Drawings

THERMOPLASTIC POLYURETHANES

RELATED APPLICATIONS

This application is a national stage application (under 35 U.S.C. §371) of PCT/EP2006/061824, filed Apr. 25, 2006, which claims benefit of Getman application 10 2005 019 663.2, filed Apr. 26, 2005.

DESCRIPTION

The invention relates to preferably transparent thermoplastic polyurethanes which preferably comprise no plasticizers and have a hardness of from 50 Shore A to 80 Shore A, preferably from 65 Shore A to 75 Shore A, and are based on (b) polyester diols, wherein a polyester diol (b1) based on butane-1,4-diol and at least one further diol having at least 5 carbon atoms, preferably 5, 6 or 7 carbon atoms, in particular 6 carbon atoms, and a polyester diol (b2) based on butane-1, 4-diol and at least one further diol having two or three carbon atoms, in particular 2 carbon atoms, are present as (b) polyester diols. In addition, the invention relates to a process for preparing preferably transparent, preferably plasticizer-free thermoplastic polyurethanes having a hardness of from 50 Shore A to 80 Shore A, preferably from 65 Shore A to 75 Shore A, by reacting (a) isocyanate with (b) compounds which are reactive toward isocyanates and have a molecular weight of from 500 g/mol to 10000 g/mol and, if appropriate, (c) chain extenders having a molecular weight of from 50 g/mol to 499 g/mol, if appropriate in the presence of (d) catalysts and/or (e) customary auxiliaries. Furthermore, the invention relates to thermoplastic polyurethanes which can be obtained in this way.

Thermoplastic polyurethanes, hereinafter also referred to as TPUs, are plastics having a wide variety of applications. Thus, TPUs are found, for example, in the automobile industry, e.g. in dashboard skins, in films, in cable sheathing, in the leisure industry, as heel lift, as functional and design element in sports shoes, as soft component in hard-soft combinations and in a wide variety of further applications.

TPUs usually have a hardness of from 80 Shore A to 74 Shore D. However, many of the abovementioned applications require a hardness below 80 Shore A. For this reason, it is prior art to add plasticizers to TPUs so as to reduce the Shore hardness. Examples of customary plasticizers are benzoates, phthalates and phosphoric esters.

When selecting the plasticizer, care has to be taken to ensure that the product is compatible with the TPU. In this context, compatible means that the plasticizer has to be able to be mixed into the TPU during the processes customary for producing TPUs and that the plasticizer subsequently remains substantially in the product during the entire time and is not lost by sweating out or emission as vapor. In addition, the mechanical properties of the TPU, e.g. the abrasion and the elastomeric properties, should not become worse.

Many plasticized TPUs go into applications in which they are also exposed to sunlight, e.g. as design elements in the shoe industry. Here, it is a disadvantage if the plasticizer contributes to yellowing of the product as a result of UV degradation.

Likewise, many plasticized TPUs are exposed during use to environmental influences which lead to a hydrolytic breakdown of the molar mass. In this context, it is a problem if the plasticizer promotes hydrolysis, whether catalytically or as a result of degradation products of the plasticizer which, for example, have been formed by hydrolysis of the plasticizer, e.g. carboxylic acids from the hydrolysis of a plasticizer comprising ester groups.

Even if the plasticizer is suitable for all the above-described applications, there is still a risk of migration of the plasticizer from the plasticized TPU into a medium which is in contact with the plasticized TPU. In the case of seals made of plasticized TPU for fuel tanks, migration of the plasticizer into the fuel, for example, can occur. This leads to embrittlement of the seal. Likewise, in food applications, migration of the plasticizer into the food can occur. Plasticized TPUs are therefore generally unsuitable for food applications.

Flexible, plasticizer-free TPUs based on polyester diols are described in EP-A 1 031 588 and EP-A 1 338 614.

It was therefore an object of the present invention to develop a flexible thermoplastic polyurethane which has a Shore A hardness of from 50 Shore A to 80 Shore A, particularly preferably from 65 A to 75 A. The flexible TPU should display no migration of a plasticizer from the TPU and should if possible have a very good stability toward weathering influences. Furthermore, the TPU should preferably be transparent and display very little or no shrinkage.

These objects have been able to be achieved by preferably transparent thermoplastic polyurethanes which preferably comprise no plasticizers, have a hardness of from 50 Shore A to 80 Shore A, preferably from 65 Shore A to 75 Shore A, and are based on (b) polyester diols, wherein a polyester diol (b1) based on butane-1,4-diol and at least one further diol having at least 5 carbon atoms, preferably 5, 6 or 7 carbon atoms, in particular 6 carbon atoms, and a polyester diol (b2) based on butane-1,4-diol and at least one further diol having two or three carbon atoms, preferably 2 carbon atoms, are present as (b) polyester diols.

The flexible TPUs of the invention are largely shrinkage-free in a single production process and at the same time have very good other properties.

Polyester diols and their use for preparing thermoplastic polyurethanes is generally known and has been described widely. Polyester diols are based on a diol component and a dicarboxylic acid component. The TPUs of the invention are based on at least two polyester diols (b1) and (b2) which differ in respect of their diol component.

The polyester diol (b1) is preferably based on butane-1,4-diol and hexane-1,6-diol. The molecular weight of the polyester diol (b1) is preferably greater than 2600 g/mol, particularly preferably in the range from 2600 g/mol to 4000 g/mol, in particular from 2800 g/mol to 3500 g/mol.

In the polyester diol (b1), the molar ratio of butane-1,4-diol to the further diol having at least 5 carbon atoms, preferably 5, 6 or 7 carbon atoms, in particular 6 carbon atoms, is preferably from 0.5:1 to 1.5:1, particularly preferably from 0.75:1 to 1.25:1.

The polyester diol (b2) is preferably based on butane-1,4-diol and ethane-1,2-diol. The molecular weight of the polyester diol (b2) is preferably less than or equal to 2500 g/mol, particularly preferably in the range from 500 g/mol to 2500 g/mol, in particular from 1500 g/mol to 2500 g/mol.

In the polyester diol (b2), the molar ratio of butane-1,4-diol to the further diol having two or three carbon atoms, in particular 2 carbon atoms, is preferably from 0.5:1 to 1.5:1, particularly preferably from 0.75:1 to 1.25:1.

The polyester diols (b1) and (b2) can be based on all generally known dicarboxylic acids. The polyester diols (b1) and (b2) are preferably based on branched and/or unbranched dicarboxylic acids, preferably linear, unbranched dicarboxylic acids, having from 4 to 12 carbon atoms, particularly preferably adipic acid.

The use according to the invention of two different esters which differ in their polarity and preferably also their molecular weight has enabled the crystallization of the hard phase to be aided by the use of the nonpolar polyester while the polar polyester suppresses shrinkage. The use of the polyol mixture prevents crystallization of the soft phase and thus subsequent hardening and clouding of the test specimens. The particularly preferred, specific mixtures comprising the two polyesters (b1) and (b2) display a particular optimum in respect of the desired properties such as, in particular, flexibility without plasticizer, very low shrinkage, transparency, low abrasion values and good tensile strengths. In addition, the TPUs based on the polyesters used according to the invention display reduced efflorescence compared to adipic acid-butanediol esters.

Particular preference is given to thermoplastic polyurethanes based on a polyester diol (b1) which has a molecular weight in the range from 2600 g/mol to 4000 g/mol and is based on butane-1,4-diol and hexane-1,6-diol in a molar ratio of butane-1,4-diol:hexane-1,6-diol in the range from 0.5:1 to 1.5:1 and adipic acid and a polyester diol (b2) which has a molecular weight in the range from 1500 g/mol to 2500 g/mol and is based on butane-1,4-diol and ethane-1,2-diol in a molar ratio of butane-1,4-diol:ethane-1,2-diol in the range from 0.5:1 to 1.5:1 and adipic acid, with the weight ratio of polyester diol (b1):polyester diol (b2) being in the range from 0.75:1 to 1.25:1, particularly preferably from 0.9:1 to 1.1:1, in particular 1:1.

Processes for preparing the polyester diols (b1) and (b2) by polycondensation of the corresponding diols with at least one dicarboxylic acid, preferably at elevated temperature and reduced pressure and preferably in the presence of known catalysts, are generally known and have been described many times. Suitable polyester diols are also commercially available.

To adjust the hardness of the TPUs, the formative components (b) and (c) can preferably be used in molar ratios of component (b) to total chain extenders to be used (c) of from 1:1 to 1:2.5, preferably from 1:1 to 1:2, in particular from 1:1.2 to 1:1.9.

Processes for preparing TPUs are generally known. For example, the thermoplastic polyurethanes can be prepared by reacting (a) isocyanates with (b) compounds which are reactive toward isocyanates and have a molecular weight of from 500 to 10000 and, if appropriate, (c) chain extenders having a molecular weight of from 50 to 499, if appropriate in the presence of (d) catalysts and/or (e) customary auxiliaries.

According to the invention, preferably transparent, preferably plasticizer-free thermoplastic polyurethanes having a hardness of from 50 Shore A to 80 Shore A, preferably from 65 Shore A to 75 Shore A, are prepared by reacting (a) isocyanate with (b) compounds which are reactive toward isocyanates and have a molecular weight of from 500 g/mol to 10000 g/mol and, if appropriate, (c) chain extenders having a molecular weight of from 50 g/mol to 499 g/mol, if appropriate in the presence of (d) catalysts and/or (e) customary auxiliaries, wherein polyester diol (b1) based on butane-1,4-diol and at least one further diol having at least 5 carbon atoms and polyester diol (b2) based on butane-1,4-diol and at least one further diol having two or three carbon atoms are used as (b). Particular preference is given to using the particularly preferred polyester diols (b1) and (b2) described above.

The polyester diols (b1) and (b2) are preferably used in a weight ratio of (b1):(b2) in the range from 0.75:1 to 1.25:1, particularly preferably from 0.9:1 to 1.1:1, in particular 1:1.

The starting components and processes for preparing the preferred TPUs will be described by way of example below.

The components (a), (b), (c) and, if appropriate, (d) and/or (e) usually used in the preparation of the TPUs will be described by way of example below:

a) as organic isocyanates (a), it is possible to use generally known aromatic, aliphatic, cycloaliphatic and/or araliphatic isocyanates, preferably diisocyanates, for example diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate, trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, preferably diphenylmethane 2,2'-, 2,4'- and/or 4,4'-diisocyanate (MDI), naphthylene 1,5-diisocyanate (NDI), tolylene 2,4- and/or 2,6-diisocyanate (TDI), hexamethylene diisocyanate and/or IPDI, in particular 4,4'-MDI and/or hexamethylene diisocyanate.

b) As compounds (b) which are reactive toward isocyanates, use is made of the polyester diols described at the outset. If appropriate, further generally known compounds which are reactive toward isocyanates can additionally be used, for example polyesterols, polyetherols and/or polycarbonate diols, which are usually collectively referred to as "polyols", and have molecular weights of from 500 to 12000 g/mol, preferably from 600 to 6000 g/mol, in particular from 800 to 4000 g/mol, and preferably a mean functionality of from 1.8 to 2.3, preferably from 1.9 to 2.2, in particular 2. Preference is given to using exclusively the polyester diols (b1) and (b2) according to the invention as compounds (b) which are reactive toward isocyanates and have molecular weights of from 500 to 12000 g/mol.

c) As chain extenders (c), it is possible to use generally known aliphatic, araliphatic, aromatic and/or cycloaliphatic compounds having a molecular weight of from 50 to 499, preferably 2-functional compounds, for example alkanediols having from 2 to 10 carbon atoms in the alkylene radical, preferably 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably oligopropylene and/or polypropylene glycols of this type, in particular 1,4-butanediol.

d) Suitable catalysts which, in particular, accelerate the reaction between the NCO groups of the diisocyanate (a) and the hydroxyl groups of the formative components (b) and (c) are the customary tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also, in particular, organic metal compounds such as titanic esters, iron compounds such as iron (III) acetylacetonate, tin compounds, e.g. tin di-acetate, tin dioctoate, tin dilaurate or the dialkyltin salts of aliphatic carboxylic acids, e.g. dibutyltin diacetate, dibutyltin dilaurate or the like. The catalysts are usually used in amounts of from 0.00001 to 0.1 part by weight per 100 parts by weight of polyhydroxyl compound (b).

e) Apart from catalysts (d), customary auxiliaries (e) can also be added to the formative components (a) to (c). Examples which may be mentioned are surface-active substances, flame retardants, nucleating agents, lubricants and mold release agents, dyes and pigments, stabilizers, e.g. against hydrolysis, light, heat or discoloration, inorganic and/or organic fillers, reinforcing materials. As hydrolysis inhibitors, preference is given to using oligomeric and/or polymeric aliphatic or aromatic carbodiimides. To stabilize the TPUs of the invention against ageing, stabilizers are preferably added to the TPU. For the purposes of the present invention, stabilizers are additives which protect a polymer or a polymer blend against damaging environmental influences. Examples are primary and secondary antioxidants, hindered amine light stabilizers, UV absorbers, hydrolysis inhibitors, quenchers and flame retardants. Examples of commercial stabilizers are given in Plastics Additive Handbook, 5th Edition, H. Zweifel, ed., Hanser Publishers, Munich, 2001 ([1]), p.98-p.136. If the TPU of the invention is exposed to thermooxidative damage during use, antioxidants can be added. Preference is given to using phenolic antioxidants. Examples of phenolic antioxidants are given in Plastics Additive Handbook, 5th edition, H. Zweifel, ed, Hanser Publishers, Munich, 2001, pp.98-107 and p.116-p.121. Preference is given to phenolic antioxidants whose molecular weight is greater than 700 g/mol. An example of a preferred phenolic antioxidant is pentaerythrityl tetrakis(3-(3,5-bis(1,1-dimethylethyl)-4-hydroxyphenyl)propionate) (Irganox® 1010). The phenolic antioxidants are generally used in concentrations of from 0.1 to 5% by weight, preferably from 0.1 to 2% by weight, in particular from 0.5 to 1.5% by weight, in each case based on the total weight of the TPU. Even though the TPUs of the invention are, as a result of their preferred composition, significantly more stable to ultraviolet radiation than are, for example, TPUs plasticized with phthalates or benzoates, a stabilizer system comprising only phenolic stabilizers is often not sufficient. For this reason, the TPUs according to the invention which are exposed to UV light are preferably additionally stabilized by means of a UV absorber. UV absorbers are molecules which absorb high-energy UV light and dissipate the energy. Customary UV absorbers which are used in industry belong, for example, to the group consisting of cinnamic esters, diphenylcyanoacrylates, formamidines, benzylidenemalonates, diarylbutadienes, triazines and benzotriazols. Examples of commercial UV absorbers may be found in Plastics Additive Handbook, 5th edition, H. Zweifel, ed, Hanser Publishers, Munich, 2001, pages 116-122. In a preferred embodiment, the UV absorbers have a number average molecular weight of greater than 300 g/mol, in particular greater than 390 g/mol. Furthermore, the preferred UV absorbers should have a molecular weight of not more than 5000 g/mol, particularly preferably not more than 2000 g/mol. The group of benzotriazols is particularly useful as UV absorbers. Examples of particularly useful benzotriazols are Tinuvin® 213, Tinuvin® 328, Tinuvin® 571 and Tinuvin® 384 and Eversorb®82. The UV absorbers are preferably added in amounts of from 0.01 to 5% by weight, based on the total mass of the TPU, particularly preferably from 0.1 to 2.0% by weight in particular from 0.2 to 0.5% by weight, in each case based on the total weight of the TPU. A UV stabilizer system as described above based on an anti-oxidant and a UV absorber is often still not sufficient to ensure good stability of the TPUs according to the invention against the damaging influence of UV rays.

In this case, a hindered amine light stabilizer (HALS) can be added to the component (e) of the TPU according to the invention, preferably in addition to the antioxidant and the UV absorber. The activity of the HALS compounds is based on their ability to form nitroxyl radicals which interfere in the mechanism of the oxidation of polymers. HALSs are highly efficient UV stabilizers for most polymers. HALS compounds are generally known and are commercially available. Examples of commercially available HALSs may be found in Plastics Additive Handbook, 5th edition, H. Zweifel, Hanser Publishers, Munich, 2001, pp.123-136. As hindered amine light stabilizers, preference is given to hindered amine light stabilizers whose number average molecular weight is greater than 500 g/mol. Furthermore, the molecular weight of the preferred HALS compounds should preferably be no more than 10000 g/mol, particularly preferably no more than 5000 g/mol. A particularly preferred hindered amine light stabilizer is the condensation product of 1-hydroxyethyl-2,2,6,6-tetramethyl-4-hydroxypiperidine and succinic acid (Tinuvin® 622). Very particular preference is given to the condensation product of 1-hydroxyethyl-2,2,6,6-tetramethyl-4-hydroxypiperidine and succinic acid (Tinuvin® 622) in which the titanium content is <150 ppm, preferably <50 ppm, in particular <10 ppm. HALS compounds are preferably used in a concentration of from 0.01 to 5% by weight, particularly preferably from 0.1 to 1% by weight, in particular from 0.15 to 0.3% by weight, in each case based on the total weight of the TPU. A particularly preferred UV stabilizer system comprises a mixture of a phenolic stabilizer, a benzotriazol and a HALS compound in the above-described preferred amounts.

Further details regarding the abovementioned auxiliaries and additives may be found in the specialist literature, e.g. in Plastics Additive Handbook, 5th edition, H. Zweifel, ed, Hanser Publishers, Munich, 2001. All molecular weights mentioned in the present text have the unit [g/mol].

The reaction of the isocyanates (a) with the compounds (b) which are reactive toward isocyanates and chain extenders (c) can be carried out at customary indexes, preferably at an index of less than 1010, particularly preferably at an index in the range from 900 to 1000, in particular from 950 to 1000. The index is defined by the ratio of the total of isocyanate groups of the component (a) used in the reaction to the isocyanate-reactive groups, i.e. the active hydrogen atoms, of the components (b) and (c). At an index of 1000, one active hydrogen atom, i.e. one isocyanate-reactive function, of the component (b) and (c) is present per isocyanate group of the component (a). At indexes above 1000, there are more isocyanate groups than OH groups present.

The preparation of the TPUs can be carried out by known methods, either batchwise or continuously, for example using reaction extruders or by the belt process by the one-shot process or the prepolymer process, preferably by the one-shot process. In these processes, the components (a), (b) and, if appropriate, (c), (d) and/or (e) to be reacted can be mixed with one another either in succession or simultaneously, with the reaction commencing immediately. In the extruder process, the formative components (a), (b) and, if appropriate, (c), (d) and/or (e) are introduced into the extruder either individually or as a mixture, reacted with one another at, for example, temperatures of from 100 to 280° C., preferably from 140 to 250° C., and the TPU obtained is extruded, cooled and pelletized.

The processing of the TPUs of the invention, which are usually in the form of pelletized material or in powder form, to produce the desired films, moldings, rolls, fibers, trim in automobiles, hoses, cable connectors, bellows, towing cables, cable sheathing, seals, belts or damping elements is carried out by customary methods, e.g. injection molding or extrusion. The thermoplastic polyurethanes which can be prepared by the process of the invention, preferably the films, moldings, shoe soles, rolls, fibers, trim in automobiles, wiper blades, hoses, cable connectors, bellows, towing cables, cable sheathing, seals, nonwovens, belts or damping elements have the advantages presented at the outset.

EXAMPLES

Example 1 cf. Table 1, Example 1

1000 g of a polyol mixture consisting of a polyester diol (b1) having a molecular weight of 3000 g/mol and based on butane-1,4-diol and hexane-1,6-diol in a molar ratio of butane-1,4-diol:hexane-1,6-diol of 1:1 and adipic acid and a second polyester diol (b2) having a molecular weight of 2000 g/mol and based on butane-1,4-diol and ethane-1,2-diol in a molar ratio of butane-1,4-diol:ethane-1,2-diol of 1:1 and adipic acid, with the weight ratio of polyester diol (b1):polyester diol (b2) being 1:1, and 64.04 g of 1,4-butanediol were weighed into a 2 l tinned plate bucket and heated to 90° C. 0.1% by weight of Irganox® 1098 and 0.1% by weight of Irganox® 1010 and 10 ppm of tin dioctoate were subsequently added while stirring. After the solution had subsequently been reheated to 90° C., 284 g of 4,4'-MDI (methylenedi(phenyl isocyanate)) were added and the mixture was stirred until the solution was homogeneous. The reaction mixture was subsequently poured into a shallow dish and heated at 125° C. on a hotplate for 10 minutes. The resulting sheet was heated at 100° C. in an oven for 24 hours. After the casts plates had been broken up into granules, these were processed on an injection-molding machine to produce 2 mm injection-molded plates. The product had a Shore hardness of Shore 71 A and an abrasion of 25 mm³. The injection-molded plate was highly transparent and displayed virtually no shrinkage.

Comparative Example 2 cf. Table 1, Example 2

1000 g of a polyester diol having a molecular weight of 2000 g/mol and based on butane-1,4-diol and 2-methylpropane-1,3-diol in a molar ratio of butane-1,4-diol:2-methylpropane-1,3-diol of 1:1 and adipic acid (polyol 1) and 65.72 g of 1,4-butanediol were weighed into a 2 l tinned plate bucket and heated to 90° C. 0.1% by weight of Irganox® 1098 and 0.1% by weight of Irganox® 1010 and 10.0 ppm of tin dioctoate were subsequently added while stirring. After the solution had subsequently been reheated to 90° C., 310 g of 4,4'-MDI (methylenedi(phenyl isocyanate)) were added and the mixture was stirred until the solution was homogeneous. The reaction mixture was subsequently poured into a shallow dish and heated at 125° C. on a hotplate for 10 minutes. The resulting sheet was heated at 100° C. in an oven for 24 hours. After the casts plates had been broken up into granules, these were processed on an injection-molding machine to produce 2 mm injection-molded plates. The product had a Shore hardness of Shore 66 A and an abrasion of 51 mm³. The injection-molded plate was highly transparent but displayed significant shrinkage of 4.8%.

The examples shown in table 1 were carried out in a manner analogous to example 1 or 2 using the polyols, chain extenders and isocyanate indicated in the table. The weights of the polyols b1, b2 and the comparative example polyol 1 having the various molecular weights are indicated in each case. The molar composition of the polyols can be taken from examples 1 and 2.

TABLE 1

| | b1 | | Polyol 1 | | b2 | | |
|---|---|---|---|---|---|---|---|
| Example | Mn = 2000 | Mn = 3000 | Mn = 2000 | Mn = 3000 | Mn = 2000 | Butanediol [g] | MDI [g] |
| 1 | | 500 | | | 500 | 64.040 | 284.0 |
| 2 | | | | 1000 | | 65.720 | 310.0 |
| 3 | 1000 | | | | | 64.620 | 310.0 |
| 4 | | | | | 1000 | 65.180 | 308.0 |
| 5 | | 500 | | | 500 | 55.760 | 261.0 |
| 6 | | | 500 | | 500 | 56.300 | 262.8 |
| 7 | | | 750 | | 250 | 64.810 | 275.0 |
| 8 | | | 500 | | 500 | 65.360 | 286.0 |
| 9 | | | 250 | | 750 | 65.180 | 295.0 |

Examples 2 to 4 and 6 to 9 are comparative examples in which either only one polyol is used (comparative examples 2-4) or polyol 1 which is not according to the invention and in which only diols having four carbon atoms are used and a combination of this polyol 1 with the polyol (b2) have been used (comparative examples 6-9).

The following mechanical properties were measured on 2 mm injection-molded plates after heating at 100° C./20 h for examples 1 to 9. The shrinkage in % was determined on a molding having an initial length of 11.9 cm. After heating of the molding, the length was measured at the left-hand edge, in the middle and at the right-hand edge and averaged.

TABLE 2

| Example | Tensile strength [MPa] | Elongation at break [%] | Abrasion [mm³] | Hardness [Shore A] | Shrinkage [%] |
|---|---|---|---|---|---|
| 1 | 36 | 790 | 25 | 71 | 0.85 |
| 2 | 32 | 830 | 51 | 66 | 4.8 |
| 3 | 46 | 600 | 28 | 75 | 1.7 |
| 4 | 36 | 770 | 39 | 70 | 3.8 |
| 5 | 34 | 800 | 27 | 67 | 0.85 |
| 6 | 37 | 870 | 32 | 65 | 5 |
| 7 | 34 | 880 | 69 | 69 | 3.8 |
| 8 | 35 | 900 | 60 | 68 | 1.7 |
| 9 | 39 | 870 | 49 | 69 | 3.4 |

It can be seen from examples 2 to 4 that polyol (b1) obviously intrinsically displays the greatest advantage in terms of shrinkage, but offers no advantage in terms of the hardness. The reduction in the hardness as a result of the use of mixtures comprising (b1) and (b2) with the shrinkage being halved at the same time can clearly be seen from examples 1 and 5 according to the invention. The comparative example 6, on the other hand, displays significant shrinkage. More detailed analysis of the composition in the examples 7 to 9 which are not according to the invention reveals that the precisely 1:1 mixture represents an optimum.

Comparative Example 10

1000 g of a polyester diol having a molecular weight of 2400 g/mol and based on butane-1,4-diol and adipic acid and 64.85 g of 1,4-butanediol were weighed into a 2 l tinned plate bucket and heated to 90° C. 0.1% by weight of Irganox®1098 and 0.1% by weight of Irganox® 1010 and 10.0 ppm of tin dioctoate were subsequently added while stirring. After the solution had subsequently been reheated to 90° C., 285 g of 4,4'-MDI (methylenedi(phenyl isocyanate)) were added and the mixture was stirred until the solution was homogeneous. The reaction mixture was subsequently poured into a shallow dish and heated at 125° C. on a hotplate for 10 minutes. The resulting sheet was heated at 100° C. in an oven for 24 hours. After the casts plates had been broken up into granules, these were processed on an injection-molding machine to produce 2 mm injection-molded plates. The product had a Shore hardness of Shore 74 A. The injection-molded plate was highly transparent, shrinkage-free, but displayed very severe efflorescence after storage for only one week at room temperature.

The invention claimed is:

1. A transparent thermoplastic polyurethane based on polyester diols (b), wherein (b) comprises a polyester diol (b1), which has a molecular weight in the range of from 2600 g/mol to 4000 g/mol, wherein (b1) is based on butane-1,4-diol and hexane-1,6-diol in a molar ratio of butane-1,4-diol:hexane-1,6-diol in the range of from 0.5:1 to 1.5:1 and adipic acid, and a polyester diol (b2) which has a molecular weight in the range from 1500 g/mol to 2500 g/mol, wherein (b2) is based on butane-1,4-diol and ethane-1,2-diol in a molar ratio of butane-1,4-diol:ethane-1,2-diol in the range from 0.5:1 to 1.5:1 and adipic acid, wherein the weight ratio of (b1) to (b2) is in the range of from 0.75:1 to 1.25:1, and wherein the transparent thermoplastic polyurethane has a hardness of from 50 Shore A to 80 Shore A.

2. A process for preparing the transparent thermoplastic polyurethanes comprising reacting isocyanate (a) with compounds (b), which are reactive toward isocyanates, and optionally chain extenders (c) having a molecular weight of from 50 g/mol to 499 g/mol, optionally in the presence of catalysts (d) and/or customary auxiliaries (e), wherein (b) comprises polyester diol (b1), which has a molecular weight in the range of from 2600 g/mol to 4000 g/mol, wherein (b1) is based on butane-1,4-diol and hexane-1,6-diol in a molar ratio of butane-1,4-diol:hexane-1,6-diol in the range of from 0.5:1 to 1.5:1 and adipic acid, and polyester diol (b2), which has a molecular weight in the range from 1500 g/mol to 2500 g/mol, wherein (b2) is based on butane-1,4-diol and ethane-1,2-diol in a molar ratio of butane-1,4-diol:ethane-1,2-diol in the range of from 0.5:1 to 1.5:1 and adipic acid, wherein (b1) and (b2) are used in a weight ratio of (b1):(b2) in the range of from 0.75:1 to 1.25:1.

3. The process of claim 2, wherein the reaction of (a) with (b) and (c) is carried out at an index of less than 1010.

4. A transparent thermoplastic polyurethane prepared by the process of claim 2.

* * * * *